Figure 2:
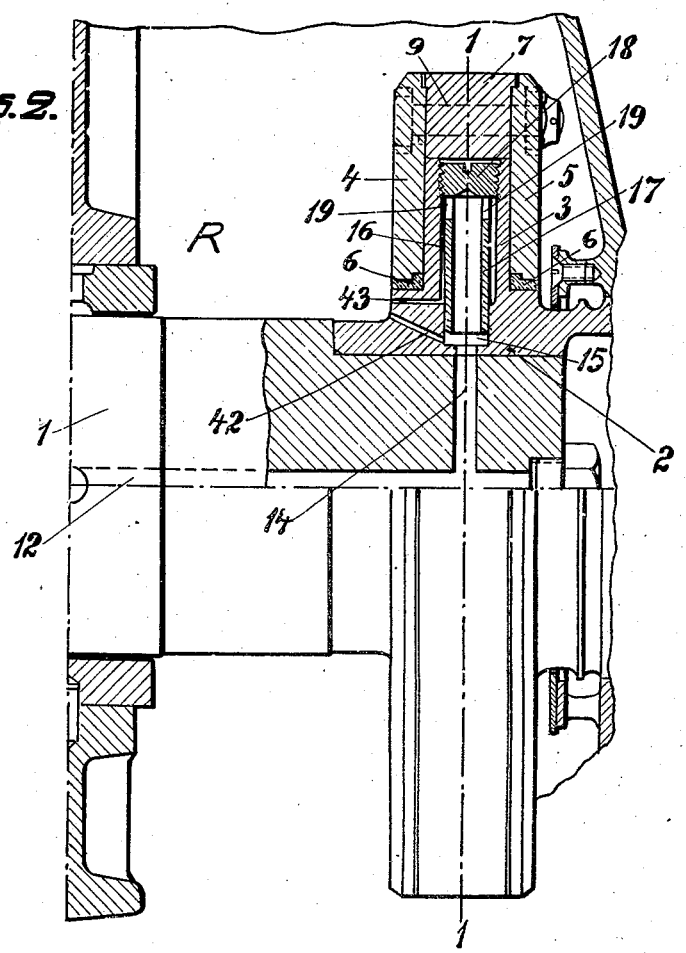

June 25, 1940.  E. O. P. THEGE  2,205,445
TORSIONAL VIBRATION DAMPER
Filed July 18, 1938  2 Sheets-Sheet 1
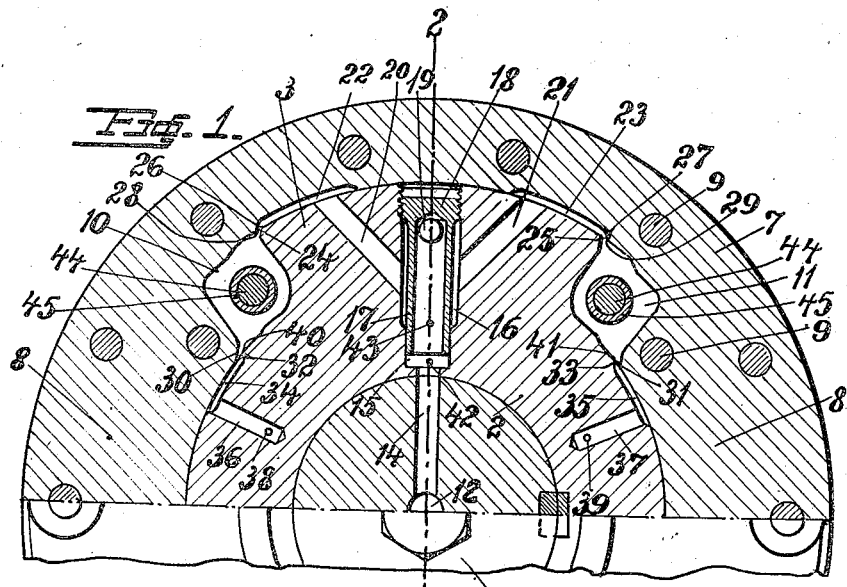
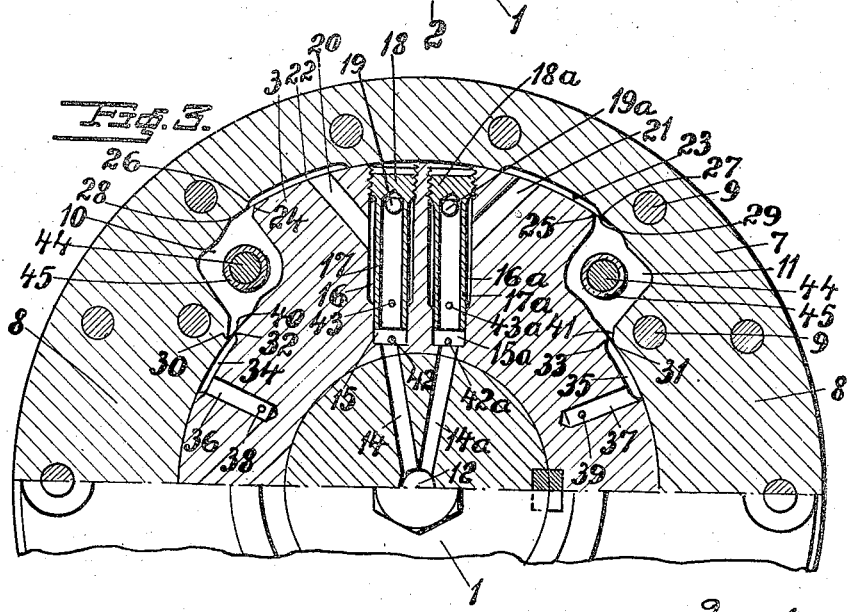
Inventor:
Edvin Ossian Parcival Thege
By Jarvis C. Marble
his Attorney June 25, 1940.  E. O. P. THEGE  2,205,445

TORSIONAL VIBRATION DAMPER

Filed July 18, 1939  2 Sheets-Sheet 2

Patented June 25, 1940

2,205,445

UNITED STATES PATENT OFFICE 2,205,445

TORSIONAL VIBRATION DAMPER

Edvin Ossian Parcival Thege, Stockholm, Sweden, assignor to Aktiebolaget Atlas-Diesel, Stockholm, Sweden Application July 18, 1938, Serial No. 219,698
In Sweden January 29, 1938

16 Claims. (Cl. 74—574)

The present invention relates to torsional vibration dampers of the type in which one or more auxiliary masses are movable between stops formed by liquid quantities enclosed between a vibrating part and the auxiliary mass or masses.

In known torsional vibration dampers of this kind the spaces enclosing the liquid between the vibrating part and the auxiliary mass have been connected to each other in pairs or in groups, so that the fluid has been caused to flow back and forth between the said pairs or groups of spaces upon the relative movements of the vibrating part and the auxiliary mass. In order to compensate for unavoidable leakage of liquid, provisions have been made for supplying liquid from the outside.

However, in such dampers it cannot be avoided that air, even though in small quantities, enters together with the liquid in the damper, and further it cannot be avoided that at the flowing back and forth of the liquid, which at least to a part can take place under throttling, a heating of the liquid and generation of gas caused thereby occur. Thus, a certain quantity of easily compressible gaseous media will appear together with the liquid in the spaces, and the mixture will act as a spring, which is not able to positively fix the magnitude of the movements between the relatively movable parts.

This brings about disturbances in the mode of operation of the damper, and the course of operation thereof will not be constant, which is essential in order to obtain reliable action.

The invention has for a general object the avoidance of the above mentioned difficulties and to this end provides structure whereby the space or spaces temporarily not exposed to the force of the auxiliary mass during the operation of the damper is or are put into communication with a supply and also simultaneously with a discharge for the liquid, so that a flow of liquid takes place through the space, whereby a rise in temperature and generation of gas will be avoided.

Also, air which may enter the spaces can be separated by locating the inlets of the spaces at a greater distance from the center of rotation than the outlets thereof, so that simultaneously with the flow of the liquid through the spaces a centrifuging action is effected.

In accordance with the invention the action can further be improved by effecting a centrifuging of the liquid before its entry into the liquid spaces.

In the annexed drawings two embodiments of a device according to the invention are shown as applied to a damper of the kind wherein the liquid spaces are formed between wing-pistons connected to the vibrating part and the auxiliary mass. Fig. 1 is an end view of part of the damper partly in section along the line 1—1 of Fig. 2. Fig. 2 is a side view of the same partly in axial section along the line 2—2 of Fig. 1. Fig. 3 shows a cross-section of the upper half of the damper according to a modified embodiment.

In the embodiment according to Figs. 1 and 2, 1 designates a shaft, for instance an engine crank shaft, the vibrations of which are to be damped. Rigidly secured to the said shaft is a hub portion 2 having two diametrically opposite wing pistons 3 (only one being visible in the figure) and forming together with said pistons the part of the damper vibrating with the shaft. Rotatably arranged tightly around the said hub portion with its wing pistons in an inertia mass, which in the present embodiment comprises two side plates 4 and 5 mounted at 6 on the hub portion 2, and also an outer annular part 7 placed between the said plates and having at two diametrically opposite places inwardly directed pistons 8 corresponding to the wing pistons 3 of the hub portion. The plates 4 and 5 and the part 7 are held together as a whole by means of circumferentially spaced bolts 9. The circumference of the wing pistons 3 bears tightly against the inner circumference of the annular part 7, and the circumference of the hub portion 2 bears tightly against the inner surface of the pistons 8. Formed between the two sides of the wing piston 3 and the opposite sides of the pistons 8 are liquid spaces 10 and 11, respectively, which are to be filled with liquid (oil).

The liquid is supplied through a central axial bore 12 in the shaft 1 to radially directed channels 14 (only one being shown in the figures), each of which opens into a likewise radially directed bore 15 in the wing piston 3. Inserted in the said bore is a sleeve 17, a space 16 being provided between the sleeve and the wall of the bore, and said sleeve is closed at its outer end by a screw head 18 formed at this en and by means of which the sleeve is secured to the wing piston. Immediately below the screw head the sleeve is provided with side openings 19 forming a communication between the interior of the sleeve and the space 16. Leading from the said space are two inclined, outwardly directed channels 20 and 21, respectively, in the wing piston, the channel 20 of which leads to a recess 22 at the inside of the annular part 7, said recess communicating with the liquid space 10 in certain positions of the inertia mass with respect to the vibrating part. Similarly, the channel 21 leads to a second recess 23 made at the inside of the annular part 7 and communicating in certain positions with the liquid space 11 at the opposite side of the wing piston. The said piston is provided at its outer ends with regulating edges 24 and 25, respectively, adapted to register with corresponding edges 26 and 27, respectively, at the outer end of the recesses 22 and 23, respectively, in the annular part 7. Formed between the said edges 24, 26 and 25, 27, respectively, in certain relative positions thereof are liquid inlets 28 and 29, respectively, to the spaces 10 and 11, respectively.

In a similar manner regulating edges 30 and 31, respectively, are provided at the inner ends of the pistons 3, said edges being adapted to register with corresponding regulation edges 32 and 33, respectively, at the hub portion 2. Inside the last mentioned edges recesses 34 and 35, respectively, are made in the hub portion, said recesses communicating with radially directed bores 36 and 37, respectively, which communicate with the outer chamber R in the damper housing through openings 38 and 39, respectively. Formed between the edges 30, 32 and 31, 33, respectively, in certain relative positions thereof are liquid outlets 40 and 41, respectively, from the spaces 10 and 11, respectively, said outlets being open in the same positions as are the corresponding inlets 28 and 29, respectively. As apparent from Fig. 1, the inlets 28 and 29 are located at a greater distance from the centre of rotation than are the outlets 40 and 41, whereby a separating of air or gas will take place, as will be more clearly described below.

Such a separation is also adapted to take place before the entrance of the liquid into the spaces 10 and 11, and to this end an outwardly directed narrow channel 42 is made in the hub portion 2 at the inner end of the bore 15, said channel forming a communication between the said bore and the outer chamber R in the damper housing. For the same purpose the inner part of the space 16 communicates with the chamber R through a narrow channel 43 in the hub portion 2. In order to limit the relative movement of the vibrating part 2, 3 and the inertia mass 4, 5, 7, in case that for any reason, for instance upon starting, the spaces 10 and 11 should not be filled or be incompletely filled with liquid, bolts 44 are provided in the said mass, said bolts extending through the spaces 10, 11 and being surrounded by sleeves 45, against which the wing piston abuts in the case mentioned. Obviously, the said bolts may be replaced by another suitable mechanical limiting device.

The supply of liquid (oil) to the damper can be effected through the pump of the ordinary pressure lubricating system of the engine or by a separate pump supplying oil to the central channel 12 in the shaft.

The action of the arrangement described is as follows.

In the intermediate position of the wing piston 3, shown in Fig. 1, the inlets 28 and 29 as well as the outlets 40 and 41 are open, and the two liquid spaces 10 and 11 communicate with each other through the channels 20, 21 and the common space 16. In this position the liquid entering through the central bore 12 in the shaft will be supplied simultaneously to both spaces 10 and 11 through the channel 14, the sleeve 17 and the openings 19 to the intermediate space 16 and from there through the channels 20, 21 leading to the said spaces.

During the rotation of the shaft 1 and the vibrations thereof and of the vibratory part 2, 3 connected thereto a relative movement of the mass 4, 5, 7 and the vibratory part 1, 2, 3 will take place due to the inertia of said mass, and depending on the temporary direction of the vibration the inlet and the outlet of the one space 10 or 11 will be closed, resulting in a limitation of the said movement by the aid of the liquid enclosed in the space in question. At the same time the inlet and the outlet of the other space not exposed to the force of the inertia mass are further opened, whereby a flow of liquid takes place through the said space and heated liquid, if any, is led off to the outer chamber R through 40, 34, 36 and 38 or 41, 35, 37 and 39 depending on which space is temporarily unloaded.

Depending on the shaping and the arrangement of the regulating edges or of the channels or openings, through which the liquid is supplied to or led off from the liquid spaces between the vibratory part and the inertia mass, the action of the damper will be based either on the fact that the liquid quantities supplied to the spaces substantially form rigid abutments, which suddenly limit the relative movement of the vibratory part and the inertia mass, or on the fact that the liquid is caused to flow out of the spaces under throttling, resulting in a more or less quick checking of the said movement, or on a combination of the two actions.

Thus, in the first case the damping is effected by the fact that vibration energy is delivered to the inertia mass as a shock and then is returned to the vibratory part at a suitable moment, whereas in the second case, the action is based on a checking of the said energy and in the third case on a combination of the said two actions.

When the movement of the vibratory part is reversed and the unloaded space is about to be closed, a return flow of liquid will take place through the mentioned communication 20, 16, 21 between the two spaces to the previously active space, which is now about to be opened. The said return flow is dependent on the size of and thus on the discharge flow through the openings 38 and 39 and may be varied by giving the said openings a greater or smaller area of passage.

Further, due to the rotation and the centrifugal force caused thereby, the heavier liquid particles will be thrown outwardly, while the lighter particles, which may be mixed with air, are moved inwardly toward the inner circumference of the space. Since the outlets 40 and 41 are located just at the last mentioned part of the space, a separating of air will thus take place through the outlet in connection with the liquid flow. Thus, upon a subsequent reversal of the vibration movement, the space in question will be wholly filled with liquid free from air, and by this the movement of the inertia mass will be positively limited and the damping will be perfect, resulting in a constant course of operation of the damper.

However, in the embodiment described a separation of air, which may be supplied together with the liquid, will take place before the entrance into the liquid spaces, namely in part through the channel 42 at the inner end of the bore 15 in the wing piston and in part through the channel 43 at the inner end of the intermediate space 16, in which a centrifuging takes place due to the rotation.

If it be assumed that upon starting, the wing piston 3 is not in the intermediate position shown, liquid can be supplied to the one liquid space only, for instance the space 10, if the position of the piston relatively to the inertia mass be such that the inlet 28 is open. If it further be assumed that simultaneously the direction of the oscillatory movement of the part 2, 3 be clockwise (Fig. 1), that is, that the limitation of the movement should take place in the space 11, such action would fail, since there is no liquid in the said space. In this case the movement will be limited by the wing piston abutting against the sleeve 45 on the bolt 44 in the space 11. However, during the subsequent oscillations of the part 2, 3 the inlet 29 of the space 11 will be repeatedly opened and thus this space will be filled with liquid in a short time. Then the action will be that as above described, and the oscillatory part obtains, without the aid of springs, a tendency to automatically adjust itself to the intermediate working position due to the varying movements of the engine shaft.

The modification of the damper shown in Fig. 3 differs from the one above described by the liquid spaces 10 and 11 being provided with wholly separate supply means for the liquid, there being inserted separate sleeves 17 and 17a in bores 15 and 15a, respectively, in the hub portion 2 and the wing piston 3, said sleeves having separate supplies 14 and 14a, respectively, and intermediate spaces 16 and 16a and openings 19 and 19a, respectively. Thus, there is no direct communication between the spaces 10 and 11, as in the embodiment according to Figs. 1 and 2. Otherwise, the action of the device is the same as the one described above in connection with Figs. 1 and 2, though with the difference that the through flow of liquid can be made more effective on account of there being no direct communication between the spaces.

Evidently, the invention is not limited to the described embodiment of the damper proper, but is applicable to all dampers working with liquid quantities wholly enclosed in terminal positions of the inertia mass, for instance according to the U. S. application Serial No. 752,324.

What I claim as new, and desire to secure by Letters Patent of the United States of America is:

1. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member.

2. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, said inlets being located at a greater distance from the centre of rotation than are the said outlets.

3. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, means for admitting liquid to and discharging it from said spaces including inlets and outlets, respectively, said latter means being operative to simultaneously admit liquid to and discharge it from the spaces temporarily not exposed to the force of the inertia member, and means for separation of air from the liquid before the entrance into said spaces.

4. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, means for admitting liquid to and discharging it from said spaces including inlets and outlets, respectively, said latter means being operative to simultaneously admit liquid to and discharge it from the spaces temporarily not exposed to the force of the inertia member, and means for separation of air from the liquid through centrifuging before the entrance into said spaces.

5. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, means for admitting liquid to and discharging it from said spaces including inlets and outlets, respectively, said latter means being operative to simultaneously admit liquid to and discharge it from the spaces temporarily not exposed to the force of the inertia member, said inlets being located at a greater distance from the centre of rotation than are the said outlets, and means for separation of air from the liquid through centrifuging before the entrance into said spaces.

6. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, two of said spaces alternately coming into action being provided with a common liquid supply conduit.

7. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, two groups of said spaces alternately coming into action being provided with a common liquid supply conduit.

8. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, said inlets being located at a greater distance from the centre of rotation than are the said outlets, two of said spaces alternately coming into action being provided with a common liquid supply conduit.

9. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, said spaces being provided with separate liquid supply conduits.

10. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, means for admitting liquid to and discharging it from said spaces including inlets and outlets, respectively, said latter means being operative to simultaneously admit liquid to and discharge it from the spaces temporarily not exposed to the force of the inertia member, and mechanical abutting means for limiting extreme movements of said inertia member relatively to said vibratory member.

11. A torsional vibration damper comprising a rotatable and torsionally vibratory member, at least one inertia member rotatable with said vibratory member and having limited movement with respect thereto, means for limiting movements of said inertia member with respect to said vibratory member including liquid cusions substantially completely trapped in spaces between said members in terminal positions of said inertia member, means for admitting liquid to and discharging it from said spaces including inlets and outlets, respectively, said latter means being operative to simultaneously admit liquid to and discharge it from the spaces temporarily not exposed to the force of the inertia member, said inlets being located at a greater distance from the centre of rotation than are the said outlets, and mechanical abutting means for limiting extreme movements of said inertia member with respect to said vibratory member.

12. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, means for admitting liquid to and discharging it from said spaces including inlets and outlets, respectively, said latter means being operative to simultaneously admit liquid to and discharge it from the spaces temporarily not exposed to the force of the inertia member, said inlets being located at a greater distance from the centre of rotation than are the said outlets, means for separation of air from the liquid through centrifuging before the entrance into said spaces, and mechanical abutting means for limiting extreme movements of said inertia member with respect to said vibratory member.

13. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, said inlets and outlets being formed between regulating edges of the vibratory member and the inertia member, respectively, registering with each other.

14. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the space temporarily not exposed to the force of the inertia member, said inlets and outlets being formed between regulating edges of the vibratory member and the inertia member, respectively, registering with each other, said regulating edges being made to simultaneously and suddenly close said inlets and outlets at movements of said inertia member relatively to said vibratory member.

15. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, said inlets and outlets being formed between regulating edges of the vibratory member and the inertia member, respectively, registering with each other, said regulating edges being made to gradually close at least either of said inlets and outlets at movements of said inertia member relatively to said vibratory member.

16. A torsional vibration damper comprising a rotatable and torsionally vibratory member, at least one inertia member rotatable with said vibratory member and having limited movement with respect thereto, means for limiting movements of said inertia member with respect to said vibratory member including liquid cushions substantially completely trapped in spaces between said members in terminal positions of said inertia member, and means for admitting liquid to and discharging it from said spaces including inlets and outlets, respectively, said latter means being operative to simultaneously admit liquid to and discharge it from the spaces temporarily not exposed to the force of the inertia member, said inlets and outlets being formed between regulating edges of the vibratory member and the inertia member, respectively, registering with each other, said regulating edges being made firstly to gradually close at least either of said inlets and outlets and then to simultaneously and suddenly close both of them at movements of said inertia member relatively to said vibratory member.

EDVIN OSSIAN PARCIVAL THEGE.